April 19, 1960  A. J. BAGGS ET AL  2,933,024
APPARATUS FOR PHOTOGRAPHING THE INTERIOR OF A PIPELINE
Filed Feb. 7, 1955  3 Sheets-Sheet 1

INVENTORS
ALBERT J. BAGGS
WILLIAM D. ULRICH
BY
Mason & Graham
ATTORNEYS

April 19, 1960     A. J. BAGGS ET AL     2,933,024
APPARATUS FOR PHOTOGRAPHING THE INTERIOR OF A PIPELINE
Filed Feb. 7, 1955     3 Sheets-Sheet 2
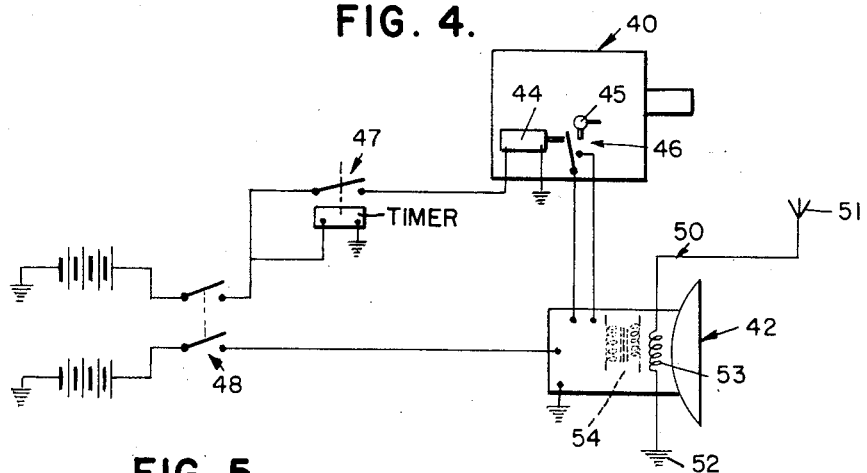
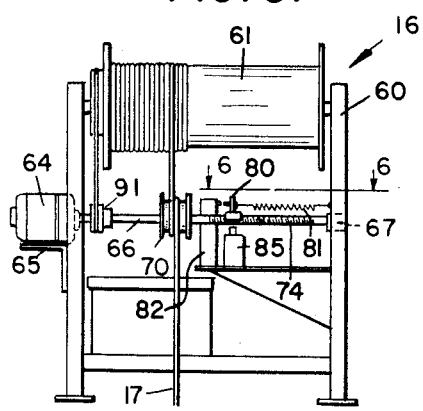
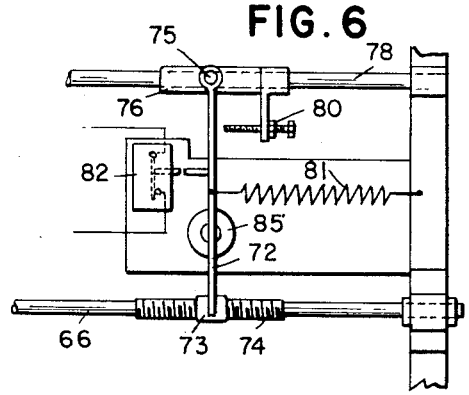
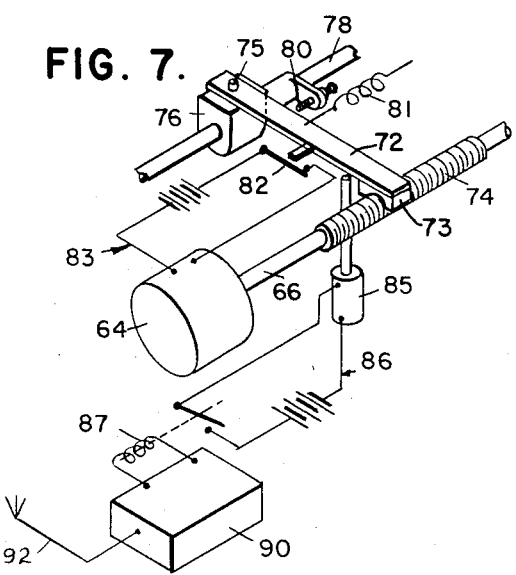
INVENTORS
ALBERT J. BAGGS
WILLIAM D. ULRICH
BY
*Mason & Graham*
ATTORNEY April 19, 1960    A. J. BAGGS ET AL    2,933,024
APPARATUS FOR PHOTOGRAPHING THE INTERIOR OF A PIPELINE
Filed Feb. 7, 1955    3 Sheets-Sheet 3

INVENTORS
ALBERT J. BAGGS
WILLIAM D. ULRICH
BY

ATTORNEYS

United States Patent Office 2,933,024
Patented Apr. 19, 1960

2,933,024

APPARATUS FOR PHOTOGRAPHING THE INTERIOR OF A PIPELINE

Albert J. Baggs, Mar Vista, and William D. Ulrich, Venice, Calif.

Application February 7, 1955, Serial No. 486,328

9 Claims. (Cl. 95—11)

This invention has to do with photographic apparatus and more particularly with apparatus for photographing the interior of a pipeline or other conduit in place in the ground.

An object of the invention is to provide novel apparatus for photographing the interior of a pipeline, particularly one carrying liquid at a level substantially below the top of the pipe, such as a pipeline carrying sewage.

A further object is to provide such apparatus by means of which a series of photographs can be taken automatically at points spaced a given distance apart along the pipeline.

A still further object is to provide novel means for the remote control of a photographing unit in a pipeline.

Another object is to provide apparatus of the type indicated in which a photographing unit in the pipeline incorporates novel means for signaling and thereby actuating apparatus located exteriorly of the pipeline each time a photographic exposure is made, together with novel means in such apparatus exteriorly of the pipeline for controlling the advance of the photographing unit in response to the signal whereby the photographing unit is advanced a predetermined selected distance between photographic exposures.

Another object is to provide novel means associated with an electronic flash unit for radiating a signal each time the unit is fired.

Still another object is to provide novel means for controlling the winding in or paying out of a line.

These and other objects will be apparent from the drawings and the following description. Referring to the drawings:

Fig. 4 is a schematic wiring diagram of the photographing unit;

Fig. 5 is a side elevational view of a winch and associated mechanism for controlling the advance of the photographing unit;

Fig. 6 is a fragmentary sectoinal plan view on line 6—6 of Fig. 5;

Fig. 7 is a schematic view of the electrical control apparatus on the winch.

Figure 1:
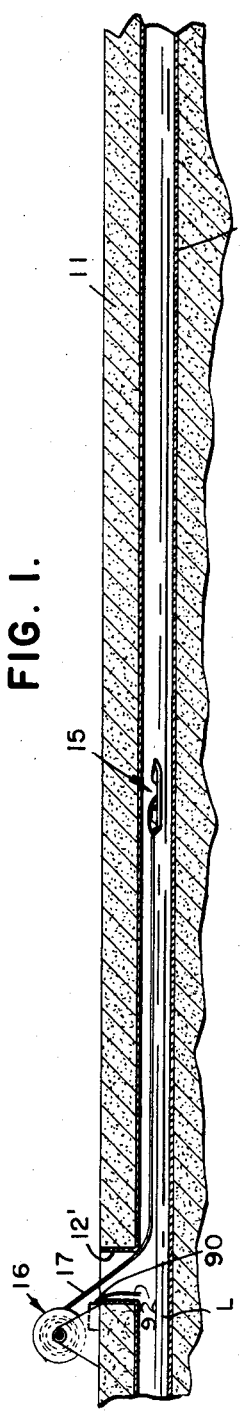
Fig. 1 is a diagrammatic view showing an underground pipeline and apparatus embodying the invention associated therewith.

More particularly describing the invention, in Fig. 1, numeral 12 indicates a pipeline buried in the earth 11, the pipeline having a riser or manhole 12'. The apparatus of the invention is particularly designed for photographing the interiors of sewage-carrying conduits or pipelines wherein the liquid, indicated by L, is at a level well below the top of the pipe; however, the device is suitable for photographing the interior of a pipeline having little or no liquid therein.

The photographing unit, designated 15, is shown connected to a winch apparatus 16 above ground by a line or cable 17. In general, apparatus 15 within the pipe takes a series of pictures at given distances along the pipe and its movement is controlled by the apparatus 16 at the surface of the ground. In the case of a pipeline containing liquid it is often preferable to pay out the line 17 periodically a given distance and allow the flowing liquid to advance the apparatus within the pipe and the apparatus has been so illustrated. However, in many instances it is necessary or desirable to use the cable to pull and thereby advance the apparatus 15.

Figure 2:
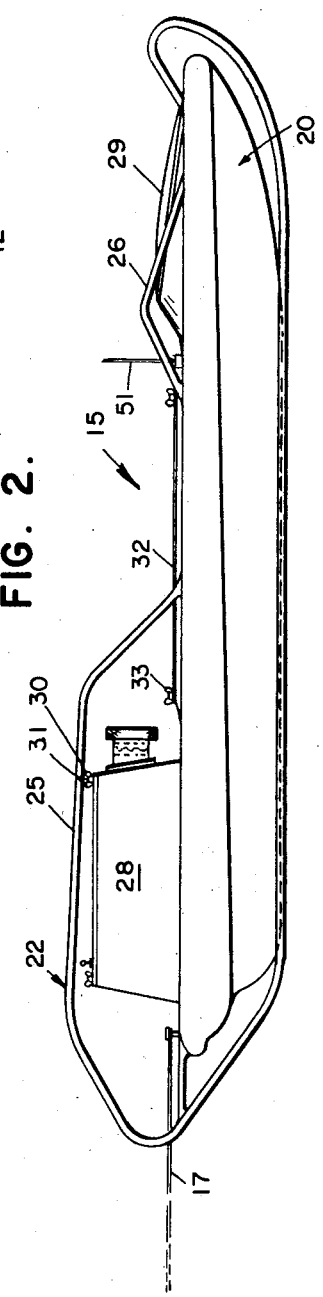
Fig. 2 is a side elevational view of a photographing unit used within the pipeline for illuminating the interior and photographing the same.
Figure 3:
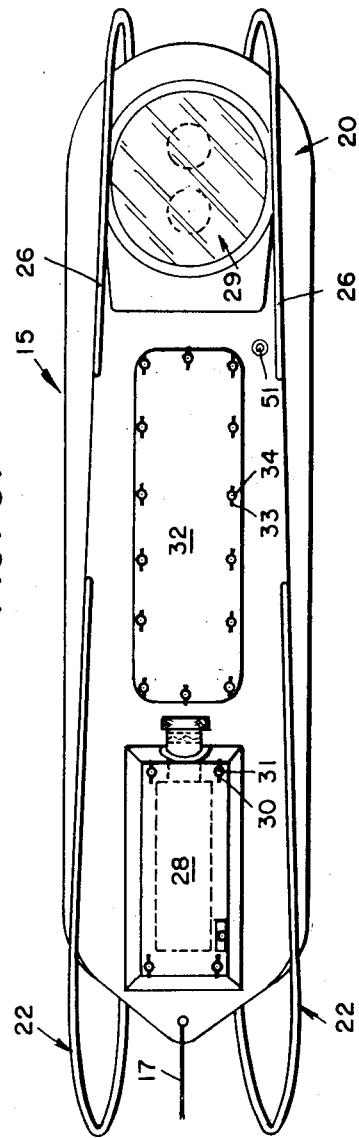
Fig. 3 is a plan view of the device of Fig. 2.

Referring to the unit 15, we provide a hollow body 20 which is in the nature of a boat hull of barge-like shape. This may be made of a waterproof and preferably corrosionproof material, such as a suitable plastic; for example Fiberglas. To protect the hull 20 and the apparatus carried thereby, we provide a pair of runners 22 mounted on the hull by any suitable means which, as shown in Figs. 2 and 3, extend under the hull 20 and beyond each end thereof. The runners bulge upwardly at two places 25 and 26 to protect a camera housing 28 and a lamp housing glass 29. These runners also serve as skids where there is no liquid present to float the device.

The hull 20 is shown fitted with the previously mentioned camera casing 28 which may be secured to the hull by suitable nuts 30 on studs 31 in the hull. Also, we provide a central hatch cover plate 32 secured by wing nuts 33 on studs 34 covering an opening (not shown) giving access to the interior of the hull. Suitable precautions are taken to insure fluidtight engagement between the cover plate, camera housing and lamp housing and the hull so that all operating parts of the apparatus are hermetically sealed within the hull and other encasement means. In addition the interior may be provided with a nonexplosive atmosphere by filling the same with nitrogen or other suitable gas.

Referring now to Fig. 4, this illustrates diagrammatically the apparatus contained within the hull 20. This includes a camera 40 and an electronic flash unit 42. This unit employs a conventional glow discharge lamp of the type used in stroboscopes operable by an electrical pulse of short duration. Such lamps have two main electrodes for conveying the glow discharge and a triggering electrode for initiating a discharge between the main electrodes. Additional electrodes may be used. A capacitor is connected between the main electrodes and this is charged by a source of direct current usually through a voltage step-up transformer. The lamp may be fired by the conventional synchronizing switch which is usually built into the camera and operated by the shutter to synchronize the camera shutter and the flash. We prefer, however, not to untilize the shutter but merely have the camera aperture open at all times, since the interior of the pipeline is dark except when illuminated by the flash unit. Therefore we use a solenoid 44 to first close a switch 46, such as a micro-switch, and then move a trip lever 45 of the film-advancing mechanism. The switch, in closing, completes the necessary circuit in the flash unit to fire the lamp in the conventional way and, since this only takes a fraction of a second, the film is not advanced before the exposure is completed.

We employ a timer 47 of any available type to control operation of the solenoid. A master switch 48 is shown operatively connected between the timer and one battery and between the flash unit and its battery. In operation, with switch 48 closed, direct current is supplied to the flash unit to charge the capacitor thereof. Also, the timer 47 begins to operate, and, after the given interval of time for which it is set, it closes a circuit to the solenoid 44. The latter closes the switch 46 to fire the flash unit and thereafter operates the film-advancing trip lever 45.

A feature of the invention is the use of the flash unit to radiate a signal that is used at the surface of the ground to control the advance of the photographing unit underground. This is accomplished by a radio or radiating circuit 50 which comprises an antenna 51, extending above the hull of the photographing unit, an external ground 52 which may be a bare wire or plate on the bottom of the hull, and a radiofrequency coil 53 inductively coupled to the secondary of the conventional transformer 54 forming part of the flash unit. We have found that with this arrangement a short electrical pulse is radiated by circuit 50 when the lamp is fired and that this can be received by a radio receiver for a distance of several hundred yards along the pipe if a receiving antenna is used in the pipe.

The control apparatus 16 includes a winch which comprises the frame 60 rotatably supporting a drum 61 about which is wound the line or cable 17. A motor 64 is mounted on a platform 65 and operates a shaft 66 which is journaled at 67. The shaft carries a friction drive pulley 91 for driving the drum. Also, on the shaft and fixed thereto is a pulley, termed a nigger pulley, about which the line is wound one complete turn. The pulley 70 is of a known given circumference, such as one foot for example, so that each time it makes one complete revolution it will be known that the line has traveled one foot.

In order to control the amount of line payed out or drawn in each time the device is operated we provide a footage regulator comprising a lever 72 having a half nut 73 engaging a spiral or screw thread 74 on the shaft. The lever pivots at 75 on a base 76 which is mounted on a rod 78. A set screw 80 is provided for limiting movement of the lever. A tension spring 81 biases the lever to the right (Fig. 5). The lever is shown in an intermediate position. When it has traveled to the left under influence of the screw it opens a switch 82 (Fig. 6) in the motor circuit 83. A solenoid 85 is positioned below the lever to kick the lever nut out of engagement with the threaded area of the shaft thereby to enable the spring 81 to return the lever to the set screw stop, closing the motor circuit. The solenoid circuit 86 is controlled by a relay 87 which is energized in any conventional way when a radio receiver 90, having an antenna 92 depending into the pipe, receives the signal given off by the circuit 50 of the photographing unit.

The pivot 75 and the fit of the half nut 73 on the threads may be loose to compensate for the arcuate path of the free end of the lever 72.

In operation then, when the flash unit 42 operates, a signal is radiated by circuit 50. This is received by receiver 90 which energizes relay 87 closing the solenoid circuit 86. Operation of the solenoid in conjunction with spring 81 moves the lever to the set screw stop. This closes the motor circuit, the motor rotates shaft 66, including the threaded part 74, turning the sheaves 70 and 91 to pay out (or wind in) the line. The lever returns under the influence of the screw 74 to open switch 82 in the motor circuit, stopping the motor and connected parts. The photographing unit has thus been advanced a predetermined amount and is in position for the next photographic exposure.

Figure 8:
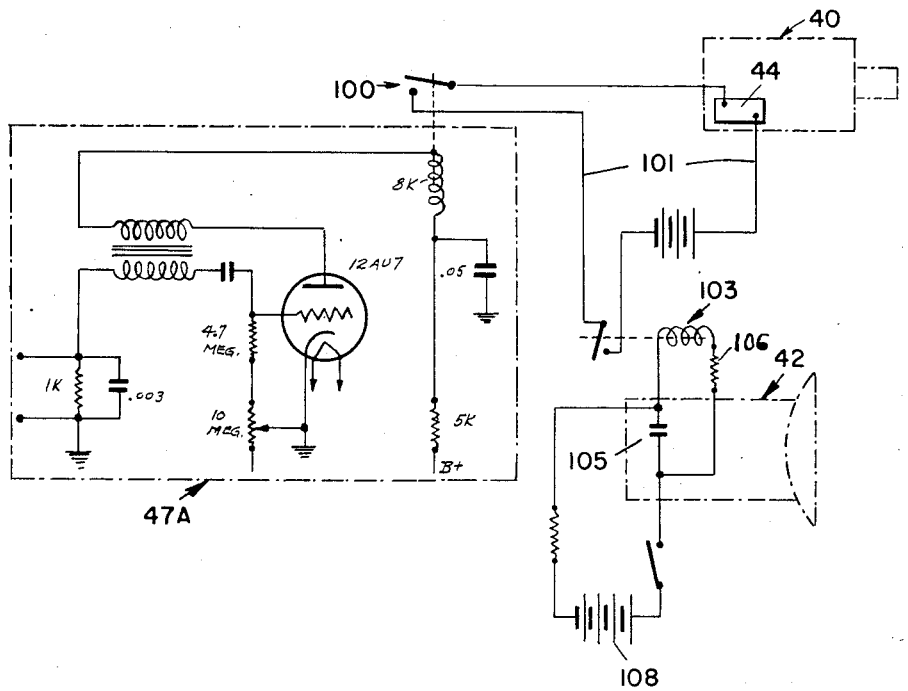
Fig. 8 is a wiring diagram of a modified form of the invention.

In Fig. 8 we show a special means for controlling the solenoid 44 which operates the switch to fire the flash unit 42. This particular means is designed to permit operation of the camera and flash unit only so long as the batteries are sufficiently charged to enable the flash unit to produce the intensity of light required. Numeral 47A indicates an electronic timing means in the nature of a blocking oscillator with a long time constant in which the tube fires, depending upon adjustment, every 3 to 15 seconds. The circuitry will be apparent to those skilled in the art. Included is a relay 100, which, when energized closes circuit 101 to the solenoid 44 provided a relay 103 is also energized. The latter relay is connected across the capacitor (or capacitors) 105 which is a standard part of the electronic flash unit, the two main electrodes of the flash glow lamp being connected (not shown) to have the capacitor discharge across them. A suitable resistance 106 is in series with the coil of the relay, being chosen so that the relay will only operate when the batteries 108 are at a given percentage of their original amperage and voltage values.

Thus, in operation, assuming batteries 108 are not run down below the desired values, relay 103 is energized closing its contacts in the solenoid circuit 101. The control or timer operates to close the points of relay 100 after the time lapse for which it is set, completing the solenoid circuit. The latter fires the flash unit as previously described and operates the camera.

In our method of taking pictures of underground pipelines, particularly those carrying sewage, it is desirable to heat the exterior lenses of the camera somewhat and this can be done by an electrical resistance unit built into the lens mount.

Although we have shown preferred forms of our invention, we contemplate that various changes and modifications can be made therein without departing from the invention, the scope of which is indicated by the following claims.

We claim:

1. In apparatus for photographing the interior of a pipeline in place in the ground, a photographing unit adapted to transverse the pipeline, said unit including a camera and a light source capable of giving a high intensity light of short duration at periodic intervals, means carried by said unit for radiating a signal each time said light source operates, and remote means responsive to said signal for controlling the advance of said photographing unit in the pipe.

2. In apparatus for photographing the interior of a pipeline in place in the ground, a photographing unit adapted to transverse the pipeline, said unit including a camera and a light source capable of giving a high intensity light of short duration at periodic intervals, means carried by said unit for radiating a signal each time said light source operates, a winch, a cable extending from the winch to said photographing unit, and means responsive to said signal for controlling said winch.

3. Apparatus as set forth in claim 2 in which said last-mentioned means includes a radio receiver, a motor for driving said winch, and means responsive to the radio receiver for closing an electrical circuit through said motor until said winch has moved a given length of cable.

4. In apparatus for photographing the interior of a pipeline in place in the ground, a vehicle adapted to traverse the pipeline, a camera carried by the vehicle, an electronic flash unit carried by the vehicle including a glow discharge lamp, a capacitance discharge circuit for the electrodes of the lamp, and a voltage step-up transformer, a circuit for radiating a signal each time said lamp is fired including an antenna, a ground externally of said vehicle, and a radiofrequency coil therebetween inductively coupled to said transformer, a source of direct current, and means for periodically firing said lamp and operating said camera.

5. In apparatus for photographing the interior of a pipeline in place in the ground, a vehicle adapted to traverse the pipeline, a camera carried by the vehicle, an electronic flash unit carried by the vehicle, said flash unit being of the glow discharge lamp type having a capacitor and a voltage step-up transformer, a source of direct current for said unit, a circuit for radiating a signal each time said lamp is fired including an antenna, a ground connection externally of said vehicle, and a radiofrequency coil therebetween inductively coupled to said transformer, means for periodically firing said lamp and operating said camera, a motor-driven winch, a cable extending from said winch to said vehicle, and means capable of receiving said signal and controlling said winch in response to said signal.

6. Apparatus as set forth in claim 5 in which said means capable of receiving said signal and controlling said winch includes a radio receiver means operable by the receiver for closing a circuit to the motor of the winch, and means operable to open the circuit to the motor after a given length of cable has been moved by said winch.

7. In apparatus as described, a vehicle for traversing a pipeline or the like, a camera mounted on the vehicle and including a film advancing mechanism, an electronic flash unit carried by the vehicle, a source of electrical current at the vehicle, means coupled to said source for periodically firing said flash unit and operating said camera film advancing mechanism, said last-mentioned means comprising an electrical solenoid means operatively connected to the camera film advancing mechanism and operatively connected to close the firing circuit of the electronic flash unit, timing means for periodically operating said solenoid means, and signal radiating means coupled to said electronic flash unit to give a signal each time said unit fires to control the advancement of the vehicle in the pipeline.

8. In apparatus for photographing the interior of a pipeline, the combination of: a vehicle for traversing the pipeline, external control means mounted externally of the pipeline for controlling the position of the vehicle in the pipeline, a cable extending from said control means to said vehicle, a camera carried by said vehicle and including a camera control means, a source of electrical energy, means coupled to said source for periodically actuating said camera control means, signal radiating means on said vehicle operable to radiate a signal each time said camera control means is actuated, and means included in said external control means responsive to the signals radiated by said radiating means for advancing said vehicle a predetermined distance in the pipeline.

9. In apparatus for photographing the interior of a pipeline, the combination of: a vehicle for traversing the pipeline, a winch adapted to be mounted externally of the pipeline, a motor for driving said winch, a cable extending from said winch to said vehicle, a camera carried by said vehicle and including a control means for advancing film in the camera, a flash unit mounted on said vehicle, a light source coupled to said flash unit for providing a high intensity light in the pipeline of short duration at periodic intervals, a source of electrical energy, means coupled to said source for periodically actuating said flash unit and for operating said camera control means, signal radiating means mounted on said vehicle and coupled to said flash unit and operable to radiate a signal each time said flash unit is actuated, and control means responsive to the signal radiated by said radiating means for controlling said winch motor to energize the same and advance said vehicle a predetermined distance in said pipeline.

References Cited in the file of this patent

UNITED STATES PATENTS

| 1,143,491 | Bidwell | June 15, 1915 |
| 1,927,474 | Trucksess | Sept. 19, 1933 |
| 1,967,468 | Douglass | July 24, 1934 |
| 2,012,456 | Kothny | Aug. 27, 1935 |
| 2,264,007 | Russell | Nov. 25, 1941 |
| 2,408,764 | Edgerton | Oct. 8, 1946 |
| 2,419,978 | Wildman | May 6, 1947 |
| 2,478,907 | Edgerton | Aug. 16, 1949 |
| 2,620,161 | Rayer | Dec. 2, 1952 |
| 2,633,783 | Laval | Apr. 7, 1953 |
| 2,737,864 | Gutterman et al. | Mar. 13, 1956 |

FOREIGN PATENTS

| 839,142 | Germany | May 15, 1952 |